United States Patent
Lindoff et al.

(10) Patent No.: US 8,937,937 B2
(45) Date of Patent: Jan. 20, 2015

(54) SYNCHRONIZATION IN HETEROGENEOUS NETWORKS

(75) Inventors: Bengt Lindoff, Bjärred (SE); Lars Lindbom, Karlstad (SE); Stefan Parkvall, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 285 days.

(21) Appl. No.: 12/897,883

(22) Filed: Oct. 5, 2010

(65) Prior Publication Data

US 2011/0310878 A1 Dec. 22, 2011

Related U.S. Application Data

(60) Provisional application No. 61/357,268, filed on Jun. 22, 2010.

(51) Int. Cl.
*H04J 11/00* (2006.01)
*H04W 56/00* (2009.01)

(52) U.S. Cl.
CPC .......... *H04J 11/005* (2013.01); *H04W 56/0015* (2013.01)
USPC ........... 370/350; 455/443; 455/444; 370/329; 370/331; 370/332; 370/333; 370/343

(58) Field of Classification Search
USPC ................ 370/329, 331, 332, 333, 343, 350; 455/435.1, 435.2, 443, 444
See application file for complete search history.

(56) References Cited

U.S. PATENT DOCUMENTS

| | | | |
|---|---|---|---|
| 2009/0011762 A1* | 1/2009 | Han et al. | 455/434 |
| 2009/0135761 A1* | 5/2009 | Khandekar et al. | 370/328 |
| 2009/0225824 A1* | 9/2009 | Noh et al. | 375/240 |
| 2010/0008282 A1* | 1/2010 | Bhattad et al. | 370/312 |
| 2010/0061333 A1* | 3/2010 | Marsh et al. | 370/330 |
| 2010/0069119 A1* | 3/2010 | Mueck et al. | 455/561 |
| 2010/0260156 A1* | 10/2010 | Lee et al. | 370/336 |

* cited by examiner

*Primary Examiner* — Dang Ton
*Assistant Examiner* — Robert M Morlan
(74) *Attorney, Agent, or Firm* — Coats and Bennett, PLLC (57) ABSTRACT

In a mobile communication network comprising a pico base station and macro base station with overlapping coverage areas, the pico base station transmits a supplemental synchronization signal to enable synchronization when the mobile terminal is operating within a link imbalance zone. The supplemental synchronization signal is transmitted using different time, frequency, and/or code resources from the primary and/or secondary synchronization signals to differentiate and separate the supplemental synchronization signals.

13 Claims, 9 Drawing Sheets

SYNCHRONIZATION IN HETEROGENEOUS NETWORKS

RELATED APPLICATION

This application claims the benefit of U.S. Provisional Patent Application 61/357,268, filed Jun. 22, 2010, titled "Synchronisation In Heterogeneous Network," which is incorporated herein by reference.

TECHNICAL FIELD

The present invention relates generally to heterogeneous networks comprising a mixture of low power and high power nodes with overlapping coverage and, more particularly, to synchronization in a heterogeneous network.

BACKGROUND

The new Third Generation Partnership Project (3GPP) standard known as Long Term Evolution (LTE) (3GPP LTE Rel-10) supports heterogeneous networks. In heterogeneous networks, a mixture of cells of different size and overlapping coverage areas are deployed. For example, a heterogeneous network may deploy pico cells served by relatively low power nodes within the coverage area of a macro cell served by relatively high power base stations. Heterogeneous networks could also deploy relatively low-power home base stations and relays to provide improved service in indoor areas. The aim of deploying low power nodes, such as pico base stations, home base stations, and relays, within a macro cell where coverage is provided by a high power base station, is to improve system capacity by means of cell splitting gains as well as to provide users with wide area experience of very high speed data access throughout the network. Heterogeneous deployment schemes represent one alternative to deployment of denser networks of macro cells and are particularly effective to cover traffic hotspots, i.e., small geographical areas with high user densities served by lower power nodes.

In heterogeneous networks, there may be a large disparity in output power of the low power nodes compared to the base stations serving macro cells. For example, the output power of the base stations in the macro cells may be in the order of 46 dBm, while the output power of the low power nodes in the pica cells may be less than 30 dBm. In some heterogeneous networks, the macro cells and pico cells operate on the same carrier frequencies and inter-cell interference coordination (ICIC) techniques are used to deal with interference when user terminals are operating in areas served by both macro cells and pico cells. For example, the transmission of the primary synchronization signals (PSS) and secondary synchronization signal (SSS) by a pico cell can be offset in time relative to the PSS and SSS transmitted by the macro cell. The macro cell can then avoid scheduling downlink transmissions in subframes when the pico cell is transmitting the PSS and SSS. Similarly, the pica cell can avoid scheduling downlink transmissions on resource elements that are used by the macro cell for transmitting the PSS and SSS.

The time-shifting of radio frames is not without drawbacks. In Time Division Duplex (TDD) systems where downlink (DL) and uplink (UL) transmissions occur on the same carrier but at different times, time shifting of radio frames across the macro and pico layers to resolve collisions of PSS/SSS would mean that a DL transmission on one layer collides with an UL transmission on the other layer. Time shifting may also be less attractive in Frequency Division Duplex (FDD) systems if the carrier supports MBSFN transmission because radio frame alignment can simplify the overall configuration.

Therefore, there is a need for ICIC techniques that do not require time-shifting of radio frames.

SUMMARY

The present invention provides techniques for inter-cell coordination between macro cells and pico cells in a heterogeneous network with overlapping coverage to enable detection, by mobile terminals operating in a link imbalance zone, of synchronization signals transmitted by the pico cells. The pico cells transmit a standard set of synchronization signals, which may be detected by mobile terminals when the mobile terminals are outside the link imbalance zone where interference from neighboring macro cells is not severe. The pico cells also transmit one or more supplemental synchronization signals, which may be detected by mobile terminals when the mobile terminals are within the link imbalance zone where interference from neighboring macro cells may preclude detection of the standard synchronization signals.

One aspect of the present invention comprises a method of inter-cell coordination in a heterogeneous network comprising first and second base stations with overlapping coverage areas. The method comprises serving a mobile terminal by a first one of said base stations. The first base station transmits first synchronization signals using first time, frequency, and/or code resources for detection by a mobile terminal when the mobile terminal is operating outside a link imbalance zone. The first base station also transmits supplemental synchronization signals using second time-frequency, and/or code resources for detection by said mobile terminal when said mobile terminal is operating inside a link imbalance zone. The supplemental synchronization signals are configured for detection by the mobile terminal when detection of the first synchronization signal is unreliable due to interference from the second base station. Further, the supplemental synchronization signal is configured so that it is differentiated from the first synchronization signal.

Another aspect of the present invention comprises a base station in a heterogeneous network comprising first and second base station with overlapping coverage areas. The base station is configured to transmit first synchronization signals using first time, frequency, and or code resources for detection by a mobile terminal when the mobile terminal is operating outside a link imbalance zone; and to transmit supplemental synchronization signals using second time, frequency, and/or code resources for detection by said mobile terminal when the mobile terminal is operating within a link imbalance zone.

In some embodiment of the invention, the supplemental synchronization signals are transmitted on a different carrier frequency in the same OFDM symbol as the first synchronization signals. The supplemental synchronization signals may be transmitted on a carrier frequency that is offset from a raster grid of said first synchronization signal.

In some embodiment of the invention, the supplemental synchronization signals are transmitted on the same carrier frequency in different OFDM symbols than the first synchronization signals.

On some embodiments of the invention, the supplemental synchronization signals are transmitted on the same carrier frequency and same OFDM symbols but with different phase than the first synchronization signals.

In some embodiments of the invention, the supplemental synchronization signals are a different symbol sequence than said first synchronization signals.

In some embodiments of the invention, the supplemental synchronization signals include a PSS and SSS different from the first synchronization signals.

In some embodiments of the invention, the supplemental synchronization signals include different PSS and the SSS as the first synchronization signals. The SSS may be scrambled with the PSS to render it transparent to a mobile terminal searching for the first synchronization signals.

DETAILED DESCRIPTION

Figure 1:
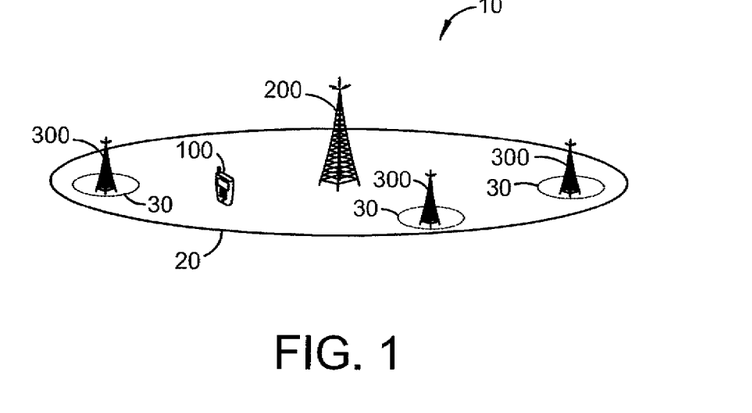
FIG. 1 illustrates macro and pica cell deployment in a mobile communication network.

Turning now to the drawings, FIG. 1 illustrates an exemplary heterogeneous communication network 10 according to one exemplary embodiment of the present invention. The present invention is described in the context of a Long-Term Evolution (LTE) network, which is specified in Release 10 of the LTE standard. However, those skilled in the art will appreciate that the invention may be applied in heterogeneous networks using other communication standards.

The communication network 10 comprises a plurality of high power access nodes providing radio coverage in respective macro cells 20 of the communication network 10. In the exemplary embodiment shown in FIG. 1, three pico cells 30 served by low power access nodes 300 are deployed within the macro cell 20. The low power access nodes may comprise pico base stations or home base stations. For convenience, the high power and low power access nodes 200, 300 will be referred to herein as the macro base stations 200 and pico base stations 300. The output power of the high power macro base stations 200 is presumed to be in the order of 46 dBm, while the output power of the pico base stations 300 is presumed to be less than 30 dBm.

In some heterogeneous networks 10, frequency separation between the different layers, i.e., macro and pico cells 20, 30 in FIG. 1, is used to avoid interference between the macro cells 20 and pico cells 30, respectively. When frequency separation is used, the macro base stations 200 and pico base stations 300 operate on different non-overlapping carrier frequencies to reduce interference between the macro and pica layers. Cell splitting gains are obtained when the radio resources in the pico cell 30 can be simultaneously used when the macro cell 20 is transmitting. However, frequency separation may lead to resource-utilization inefficiency. For example, when the pico cell 30 is lightly loaded so that its resources are not fully utilized, it may be more efficient to assign all carrier frequencies to the macro cell 20. However, the split of carrier frequencies between layers is typically static.

In some heterogeneous networks 10, radio resources on same carrier frequencies are shared by the macro and pico layers by coordinating transmissions in the overlapping macro and pico cells 20, 30. This type of coordination is referred to as inter-cell interference coordination (ICIC). Certain radio resources are allocated for the macro cells 20 during specified time period and the remaining resources can be accessed by pico cells 30 without interference from the macro cell 20. Depending on the load distribution across the layers, the resource split can change over time to accommodate different load distributions. In contrast to the splitting of carrier frequencies, sharing radio resources across layers using some form of ICIC can be made more or less dynamic depending on the implementation of the interface between the access nodes. In LTE, an X2 interface has been specified in order to exchange different types of information between base stations 200, 300. One example of such information exchange is that a base station 200, 300 can inform other base stations 200, 300 that it will reduce its transmit power on certain resources.

Time synchronization between base stations 200, 300 is required to ensure that ICIC across macro and pico layers will work efficiently in heterogeneous networks. Time synchronization is particularly important for time domain based ICIC schemes where resources on the same carrier are shared by macro and pico base stations.

Figure 2:
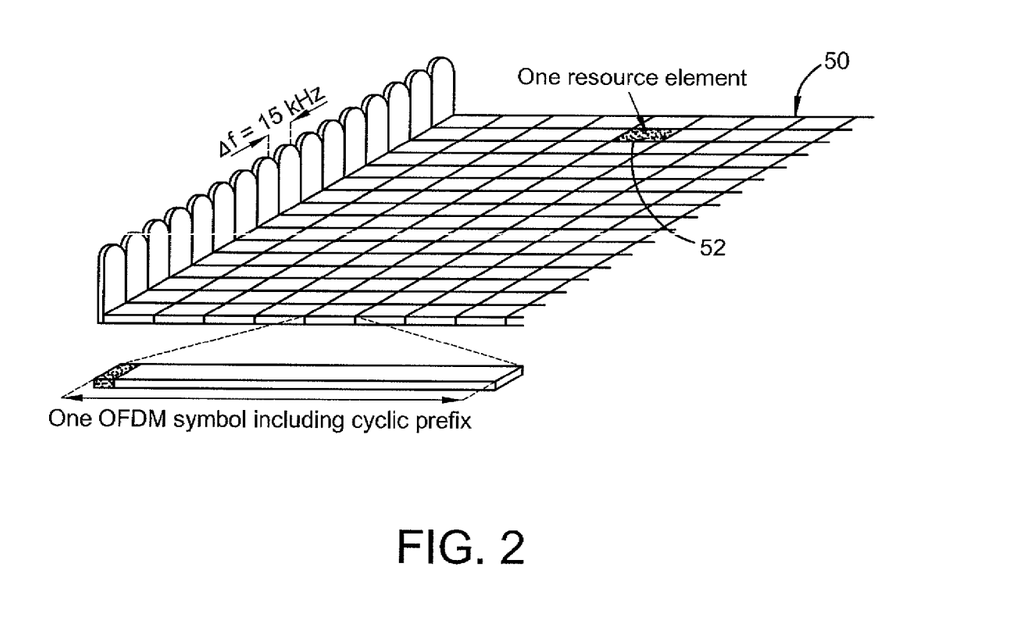
FIG. 2 illustrates downlink physical resources in an exemplary OFDM network.

LTE uses Orthogonal Frequency Division Multiplexing (OFDM) in the downlink and Discrete Fourier Transform (DFT) spread OFDM in the uplink. The available radio resources in LTE systems can be viewed as a time-frequency grid. FIG. 2 illustrates a portion of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element 52. A resource element 52 comprises one OFDM subcarrier during one OFDM symbol interval.

Figure 3:
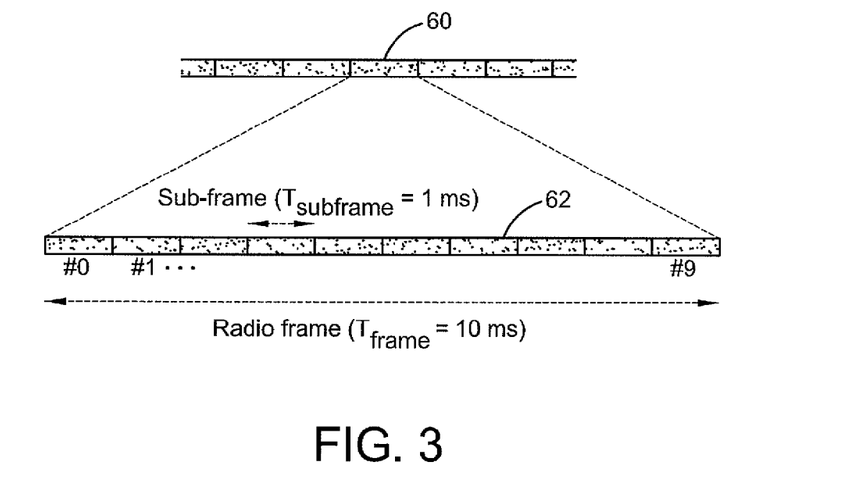
FIG. 3 illustrates time-domain structure in an exemplary OFDM network.

As shown in FIG. 3, the downlink transmissions are organized into 10 ms radio frames 60. Each radio frame 60 comprises ten equally-sized subframes 62. For purposes of scheduling users to receive downlink transmissions, the downlink time-frequency resources are allocated in units called resource blocks (RBs). Each resource block spans twelve subcarriers (which may be adjacent or distributed across the frequency spectrum) and one 0.5 ms slot (one half of one subframe). The term "resource block pair" refers to two consecutive resource blocks occupying an entire one millisecond subframe.

Figure 4:
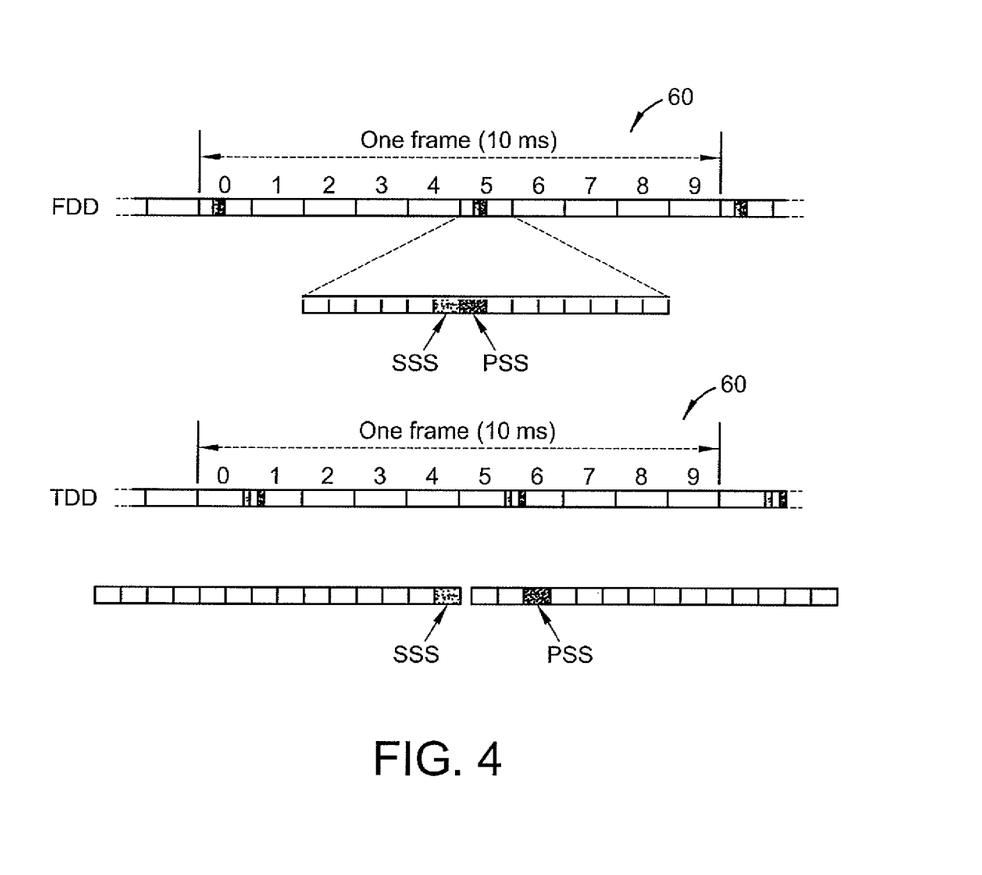
FIG. 4 illustrates the timing of synchronization signals for FDD and TDD in an exemplary OFDM network.

In order to establish a connection with the LTE network 10, the mobile terminal 100 needs to find and acquire synchronization with a cell 20, 30 within the network 10, read system parameters from a broadcast channel in the cell 20, 30, and perform a random access procedure to establish a connection with the cell 20, 30. The first of these steps is commonly referred to as cell search. To assist the mobile terminal 100 in the cell search procedure, the base station 200 transmits two synchronization signals on the downlink: the Primary Synchronization Signal (PSS) and the Secondary Synchronization Signal (SSS). The timing of the synchronization signals is illustrated in FIG. 4. For LTE radio frame structure type 1 (used for FDD deployments), the PSS and SSS are transmitted within the two last OFDM symbols in the first slot of subframes 0 and 5. For LTE radio frame structure type 2 (used for TDD deployments), the SSS is transmitted in the last OFDM symbol of subframe #0 and #5, whereas PSS is transmitted within the third OFDM symbol of subframe 1 and 6. The synchronization signals are transmitted in the center of the system bandwidth, occupying 6 resource blocks in the frequency domain. The difference in the positions of the synchronization signals in the case of FDD and TDD allows for the detection of the duplex scheme used on a carrier if this is not known in advance.

The synchronization signals transmitted in each cell 20, 30 comprise a specific set of sequences that define the cell identity. There are 504 different physical cell identities (PCIs) defined for LTE, where each PCI corresponds to one specific downlink reference-signal sequence. The PCIs are further divided into 168 cell-identity groups, with three PCIs within each group. The LTE standard specifies the location in time and frequency of the synchronization signals. The time-domain positions of the synchronization signals within the frame differ somewhat depending on if the cell 20, 30 is using frequency-division duplex (FDD) or time-division duplex (TDD). By detecting the synchronization signals, the mobile terminal 100 will acquire the timing of a cell 20, 30, and, by observing which of multiple sequences the cell is transmitting, the mobile terminal 100 can identify the cell 20, 30.

Within a cell, the two PSSs within a given radio frame are identical and take a different value depending on the PCI of the cell 20, 30. More specifically, the three cell identities within a cell-identity group always correspond to different PSS. Thus, once the mobile terminal 100 has detected the PSS of the cell 20, 30, it has the frame timing of the cell 20, 30 within 5 ms and the cell identity group of the cell 20, 30. Thus, the number of possible PCIs has been narrowed to 168 rather than 504. Also, because the SSS has a fixed offset relative to the PSS, the mobile terminal 100 knows the position of the SSS. From the SSS, the mobile terminal 100 finds the exact frame timing (one of two possibilities based on the PSS) and determines the cell identity.

It should be possible for a mobile terminal 100 to determine frame timing and the cell identity from the reception of a single SSS because the search window may not be sufficiently large to cover more than one SSS. Accordingly, each SSS can take 168 different values corresponding to the 168 different cell-identity groups. Furthermore, the set of values valid for the two SSSs within a frame ($SSS_1$ in subframe 0 and $SSS_2$ in subframe 5) are different, implying that, from the detection, of a single SSS, the mobile terminal 100 is able to determine whether $SSS_1$ or $SSS_2$ has been detected and thus determine the frame timing.

Once the mobile terminal 100 has acquired frame timing and the PCI of the cell 20, 30, the mobile terminal 100 has identified the cell-specific reference signal and can receive the necessary system information for accessing the cell 20, 30.

In the case where the mobile terminal 100 does not know which carrier frequency to search for the PSS and SSS, it may try multiple carrier frequencies. To simplify the cell search procedure, LTE is using a 100 kHz carrier raster, i.e., a carrier can only be located on frequencies being multiples of 100 kHz. The fixed spacing of carriers significantly reduces the number of candidate carrier frequencies a mobile terminal 100 needs to include in the cell search.

A mobile terminal 100 does not carry out cell search only at power-up, i.e. when initially accessing the system. In order to support mobility, the mobile terminals 100 need to continuously search for, synchronize to, and estimate the reception quality of signals transmitted by neighbor cells. The mobile terminals 100 may evaluate the reception quality of signals from the neighbor cells, in comparison to the reception quality of the current serving cell, to determine whether a handover (for mobile terminals 100 in connected mode) or cell re-selection (for mobile terminals 100 in idle mode) should be carried out. For mobile terminals 100 in connected mode, the network 10 makes the handover decision based on measurement reports provided by the mobile terminals 100.

The measurement reports provided by the mobile terminal 100 may include measurements of the reference signal received power (RSRP) and/or reference signal received quality (RSRQ). Depending on how these measurements, possibly complemented by a configurable offset, are used, the mobile terminal 100 can be connected to the cell 20, 30 with the strongest received power, or the cell 20, 30 with the lowest path loss, or a combination of the two. These selection criteria (received power and path loss) do not necessarily result in the same selected cell 20, 30. Because the output power varies for different types of cells 20, 30, it is possible that, for a given mobile terminal 100, the cells 20, 30 with the highest RSRP and RSRQ measurements and the cells 20, 30 with the lowest path loss are different. This situation is referred to herein as link imbalance.

Figure 5:
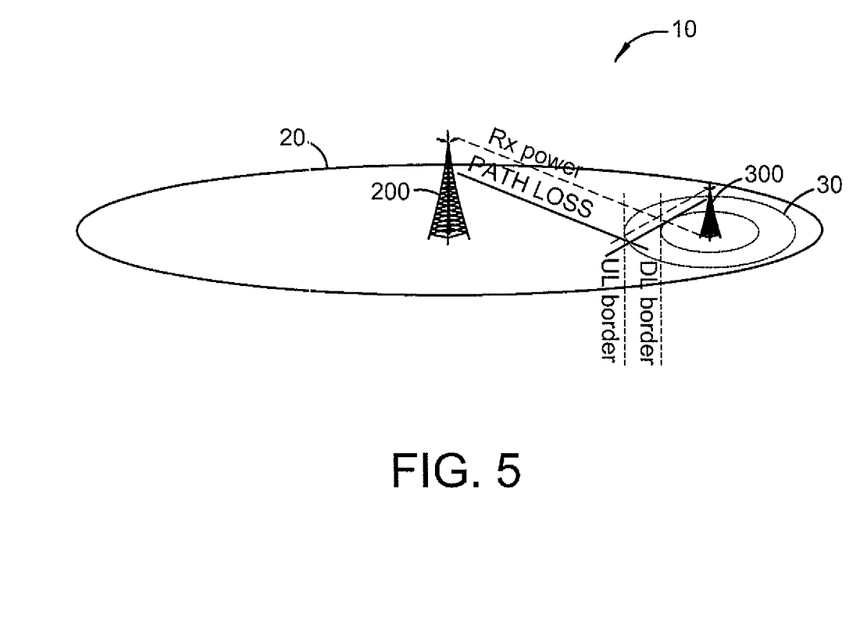
FIG. 5 illustrates uplink and downlink coverage in a mixed cell scenario in an exemplary OFDM network.

FIG. 5 illustrates how link imbalance can occur in a heterogeneous network 10. It is realistically presumed for purposes of this example that the output power of a pico base station 300 in the pico cell 30 is in the order of 30 dBm or less, while the output power of the macro base station 200 is in the order of 46 dBm. Consequently, when the mobile terminal 100 is operating near the cell edge of the pico cell 30, the received signal strength from the macro cell 20 can be much larger than that of the pico cell 30. However, the path loss to the base station 200 in the macro cell 20 may be greater than the path loss to the pico base station 300 in the pico cell 30.

In FIG. 5 the downlink border indicates the point at which the received signal strength from the macro cell 20 and pico cell 30 is equal. The uplink border indicates the point at which the path loss to the base stations 200, 300 in the macro cell 20 and pico cell 30 respectively are equal. The region between the DL and UL borders is the link imbalance zone. From a downlink perspective, it may be better for a mobile terminal 100 in the link imbalance zone to select a cell 20, 30 based on downlink received power, but from an uplink perspective, it may be better to select a cell 20, 30 based on the path loss because the transmit power of the mobile terminal 100 is limited. In this scenario, it might be preferable from a system perspective for the mobile terminal 100 to connect to the pico cell 30 even if the macro downlink is up to 10-20 dB stronger than the pico cell downlink. Therefore, the mobile terminal 100 needs to detect and measure signals from the pico cells 30 even when there is a large disparity in the signal power as compared to the macro cells 20.

Figure 6:
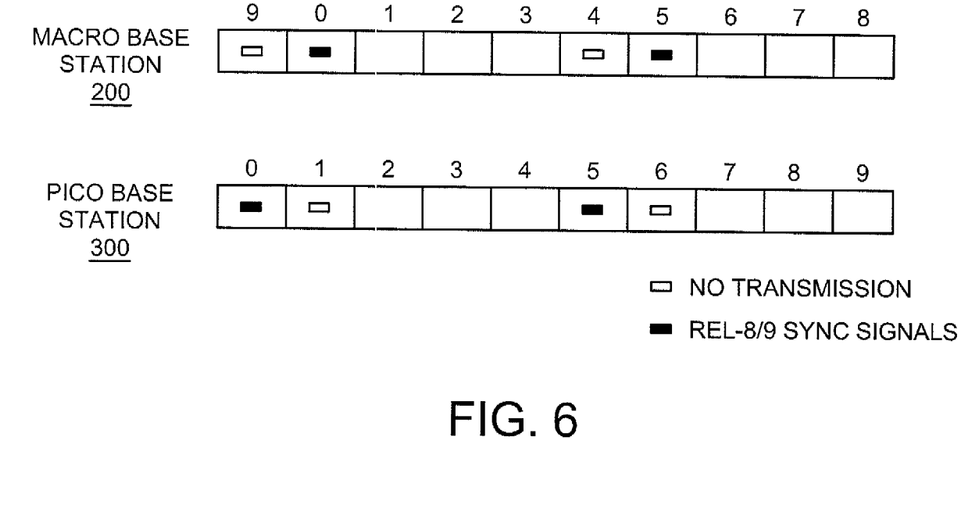
FIG. 6 illustrates time-shifting of radio frames in an exemplary OFDM network to achieve separation of synchronization signals by macro and pico base stations.

FIG. 6 illustrates one method of coordinating the transmission of the PSS and SSS between macro and pico layers, which introduces a relative time-shift of the radio frames between macro cells 20 and pico cells 30. In this approach, the macro base station 200 is aware of the PSS/SSS transmissions on the pico layer and can then avoid scheduling data (at least) in resource elements that collide with transmissions of the PSS and SSS by the pico cell 30. Furthermore, the pico base station 300 may avoid scheduling data in resource elements that collide with the PSS and SSS transmission by the macro cell 20. This inter-cell interference coordination would be needed when the mobile terminals 100 operate within region of the UL border and the DL border depicted in FIG. 4.

In Time Division Duplex (TDD) systems where downlink (DL) and uplink (UL) transmissions occur on the same carrier but at different times, time shifting of radio frames across the macro and pico layers to resolve collisions of PSS/SSS would mean that a DL transmission on one layer collides with an UL transmission on the other layer. Time shifting may also be less attractive in Frequency Division Duplex (FDD) systems if the carrier supports MBSFN transmission because radio frame alignment can simplify the overall configuration.

Accordingly, embodiments of the present invention provide alternative methods for coordinating the transmission of the PSS and SSS between macro and pico layers without introducing a time shift between layers. In each case, a supplemental synchronization signal (PSS and/or SSS) is introduced, which may be different from PSS/SSS defined in the Rel-8/9 of the 3GPP LTE standard. The coexistence of two sets of synchronization signals could be a problem for legacy mobile terminals 100 based on LTE Rel-8/9. Accordingly, one aspect of the present invention is to render the supplemental synchronization signals transparent to legacy mobile terminals 100.

Figure 7:
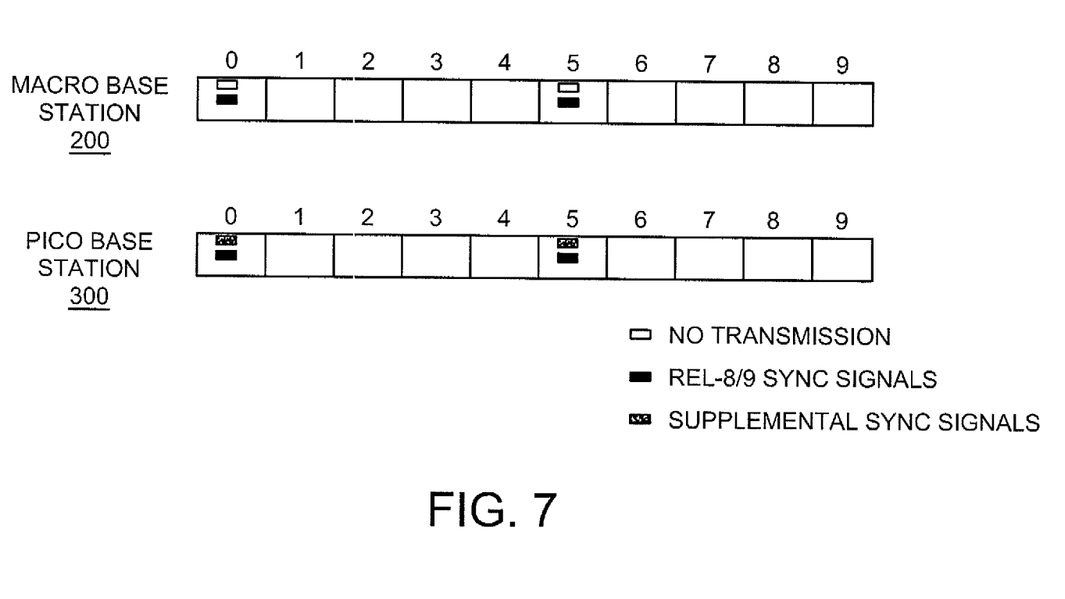
FIG. 7 illustrates frequency separation of standard and supplemental synchronization signals transmitted by a pico base station.

FIG. 7 illustrates one method of transmitting supplemental synchronization signals that are transparent to legacy mobile terminals 100. In this embodiment, the macro base station 200 and pico base station 300 transmit the standard PSS/SSS according to LTE Rel-8/9. The pico base stations 300 additionally transmit a set of supplemental synchronization signals in the same subframes, but on different carrier frequencies. The supplemental synchronization signals may include both a supplemental PSS and supplemental SSS. The macro base station 200 is aware of the carrier frequencies on which the pico base station 300 is transmitting the supplemental synchronization signals and avoids scheduling transmission of downlink data on those resources. The frequency location for the supplemental synchronization signals is sufficiently far away from the carrier frequencies for Rel-8/9 PSS/SSS to avoid interference from other cell layers. For example, instead of locating the PSS/SSS in the 6 center resource blocks on a carrier, the location could be at one edge of the carrier frequency or at least sufficiently "off center" such that a Rel-8/9 terminal will not see the new synchronization signals. To ensure that a Rel-8/9 terminal does not find the new synchronization signals, the frequency location should not match the 100 kHz raster. This is particularly helpful if at least the same set of PSS/SSS sequences specified in Rel-8/9 are used as supplemental synchronization signals. Preferably, the frequency location is fixed relative to the carrier frequency, e.g., by using an offset being a multiple of 180 kHz (the resource block bandwidth) but not a multiple of 100 kHz.

Figure 8:
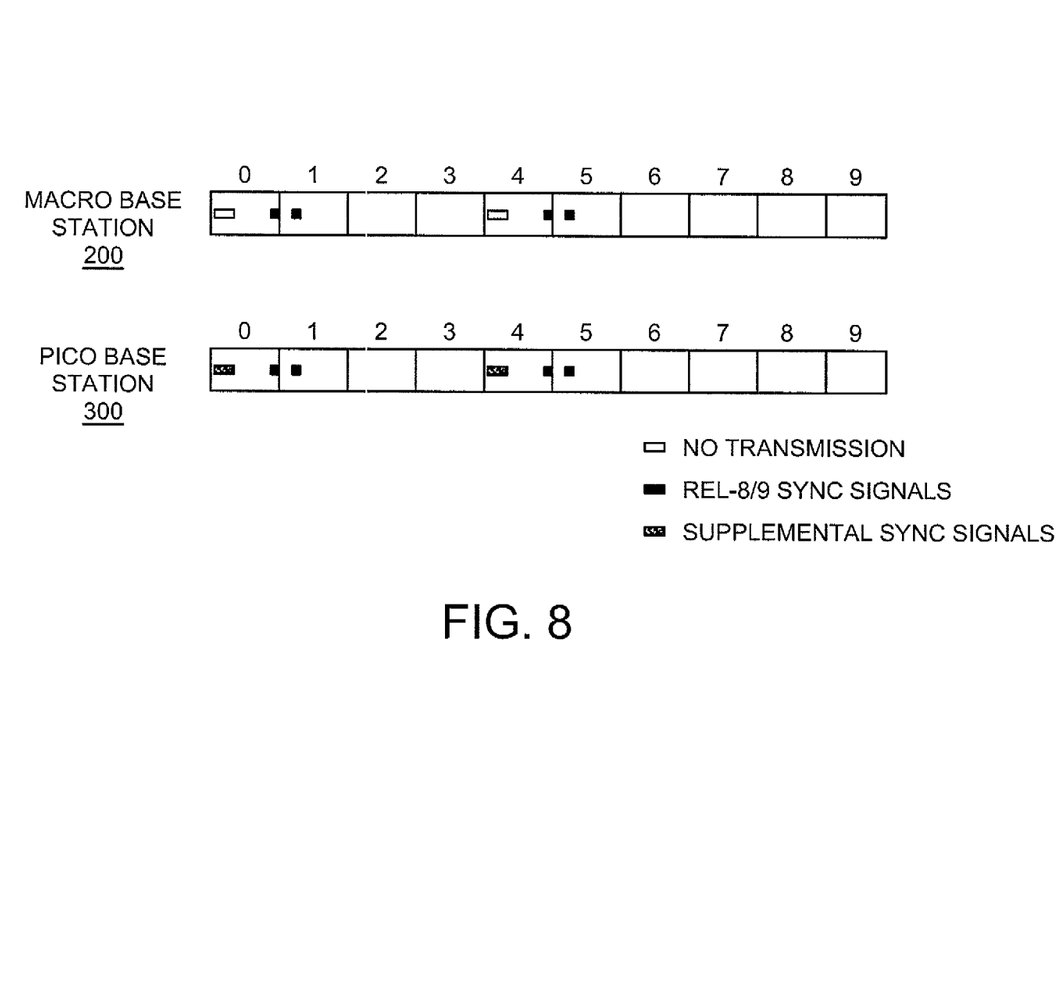
FIG. 8 illustrates time separation of standard and supplemental synchronization signals transmitted by a pico base station.

FIG. 8 illustrates another method of transmitting supplemental synchronization signals that are transparent to legacy mobile terminals 100. In this embodiment, the macro base station 200 and pico base station 300 transmit standard PSS/SSS according to LTE Rel-8/9 as previously described. In this case, the new synchronization signals occupy the same carrier frequencies as Rel-8/9 PSS/SSS, but are located in different OFDM symbols. In embodiments where the same set of PSS/SSS is reused as supplemental synchronization signals, the separation in time between the PSS and SSS should differ from the Rel-8/9 FDD and TDD locations in order to prevent Rel-8/9 terminals from accidentally finding the new synchronization signals.

As previously noted, the supplemental synchronization signals should be transparent to the legacy mobile terminals 100. One way to prevent legacy mobile terminals 100 from accidentally finding the new synchronization signals is to use a different set of PSS/SSS compared to Rel-8/9. A legacy terminal 100 would therefore not find the new PSS. Furthermore, since the SSS is scrambled by the PSS, the SSS set could be kept also for the new synchronization signals as those would, due to the scrambling operation, basically appear as white noise to a legacy mobile terminal 100. An advantage of this approach is that the mobile terminal implementation is reduced because the same SSS circuitry for Rel-8/9 mobile terminals 100 could be reused and only a set of new PSS sequences would be needed for the Rel-10 mobile terminals 100.

Figure 9:
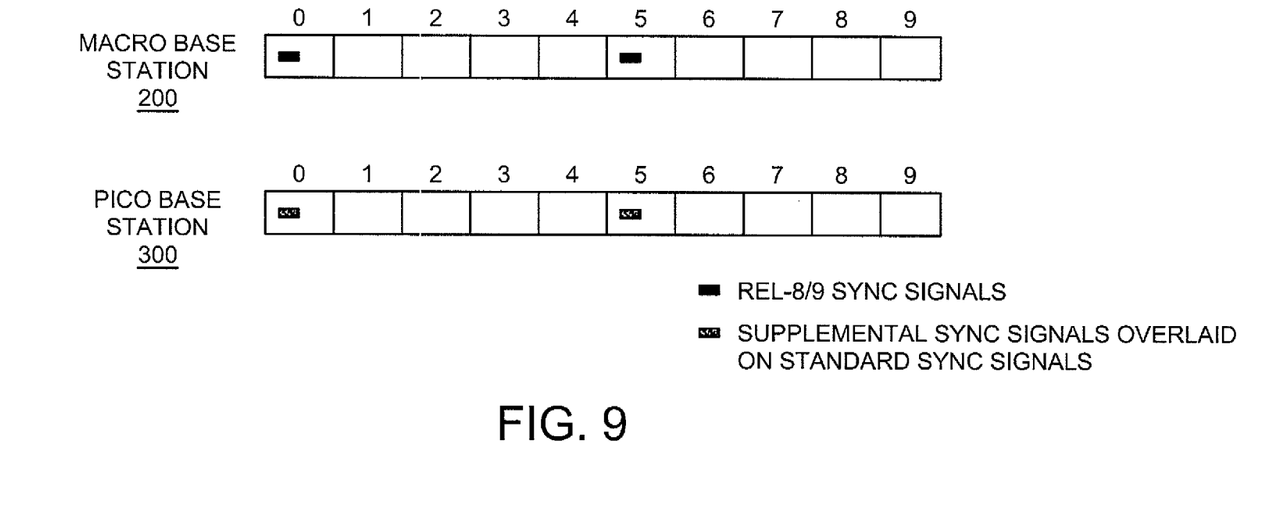
FIG. 9 illustrates code separation of standard and supplemental synchronization signals transmitted by a pico base station.

In a third embodiment, shown in FIG. 9, a new SSS is introduced and overlaid on the Rel-8/9 SSS. Since the Rel-8/9 SSS is a binary M-sequence, i.e., transmitted on the I branch, a binary supplemental SSS may be transmitted on the Q-branch so that the supplemental SSS is orthogonal to the Rel-8/9 SSS. The supplemental SSS could be the same as the SSS for Rel-8 but scrambled with a different scrambling code. In one example, each Rel-8/9 PSS sequence has an associated Rel-10 PSS sequence that is used for scrambling the supplemental SSS. Hence, in this case there is only a new physical SSS introduced. In another example, a new set of PSS is also transmitted and used for scrambling the SSS (similar to as mentioned in relation to the second embodiment).

Figure 10:
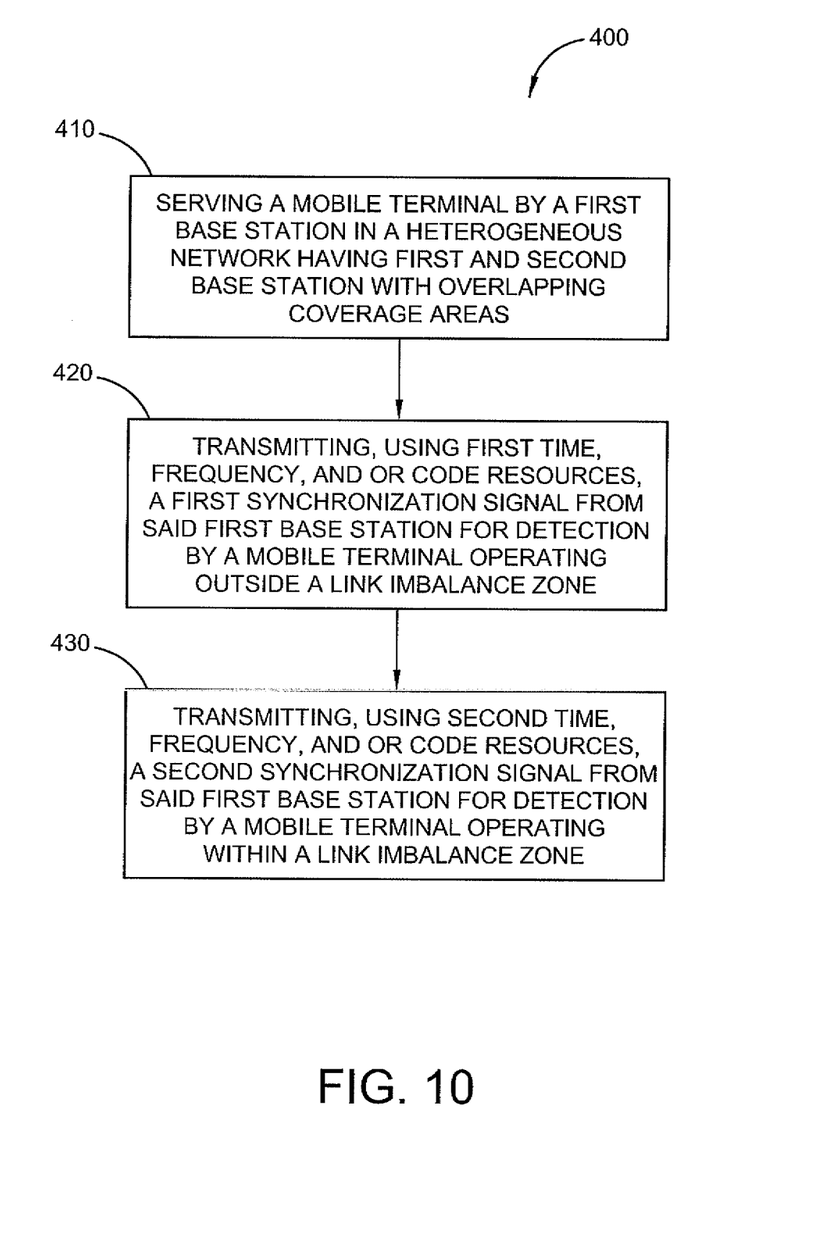
FIG. 10 illustrates an exemplary method of inter-cell coordination.

FIG. 10 illustrates an exemplary method 400 of inter-cell coordination between first and second base stations 200, 300 with overlapping coverage areas. A mobile terminal 100 is served by a first base station in a heterogeneous network having a coverage area overlapping with a second base station (block 410). The serving base station may, for example, comprise a pico base station 300 in a pico cell 30. The pico base station 300 transmits a first synchronization signal to the mobile terminal 100 using first time, frequency, and/or code resources, for detection by the mobile terminal 100 when the mobile terminal is outside a link and balance zone (block 420). The pico base station 300 also transmits a supplemental synchronization signal using second time, frequency, and/or code resources, for detection by the mobile terminal 100 when the mobile terminal 100 is within a link and balance zone (block 430). The second base station, i.e., the macro base station 200, may avoid scheduling downlink transmissions to users on the resources used for transmission of the supplemental synchronization signals by the pico base station 300.

Figure 11:
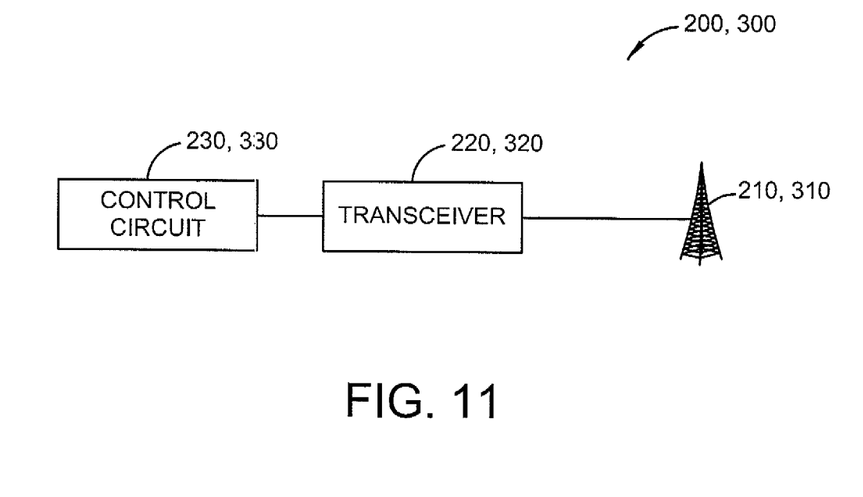
FIG. 11 illustrates the main functional components of a base station implementing inter-cell coordination techniques.

FIG. 11 illustrates an exemplary base station 200, 300 in a heterogeneous network for implementing the inter-cell coordination techniques as described herein. The base station 200, 300 comprises an antenna 210, 310 coupled to a transceiver 220, 320 and a control circuit 230, 330. The transceiver 220, 320 comprises a standard cellular transceiver operating according to the LTE standard as hereinabove described, or other standard for heterogeneous networks now known or later developed. Control circuit 230, 330 controls the overall operation of the base station 200, 300. The functions performed by the control circuit include radio resource management and interference coordination. The control circuit 230, 330 may be implemented by one or more processors, hardware, firmware, or a combination thereof. The control circuit 230, 330 may further include persistent and non-persistent memory. The control circuit 230, 330 is configured to implement the procedures herein described and, in particular, to implement the procedures shown in FIG. 10. The control circuit 230, 330 may include persistent memory, such as read-only memory, for storing program instructions to implement the inter-cell coordination procedures.

With the presence of supplemental synchronization signals, there will be a greater chance of mobile terminals 100 finding cells 20, 30 at SNRs below the LTE Release 8 requirements. Thus, the present invention enables the possibility to improve uplink coverage (capacity in general) using heterogeneous deployment.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of inter-cell coordination between first and second base stations with overlapping coverage areas in an OFDM network, said method comprising:
    serving a mobile terminal by a first one of said base stations;
    transmitting first synchronization signals from said first base station on first subcarrier frequencies for detection by the mobile terminal when said mobile terminal is operating outside a link imbalance zone, said first synchronization signals including a first primary synchronization signal and a first secondary synchronization signal; and
    transmitting supplemental synchronization signals distinct from said first synchronization signals from said first base station on said first subcarrier frequencies for detection by said mobile terminal when said mobile terminal is operating inside a link imbalance zone, said supplemental synchronization signals including a second primary synchronization signal and a second secondary synchronization signal;
    wherein, the first and second secondary synchronization signals are transmitted in the same subframe on different OFDM symbols.

2. The method of claim 1 wherein the supplemental synchronization signals comprise different symbol sequences than said first synchronization signals.

3. The method of claim 1 wherein the second primary synchronization signal and the second secondary synchronization signals transmitted as supplemental synchronization signals are different from the first synchronization signals.

4. The method of claim 1 wherein the supplemental synchronization signals comprise a second primary synchronization signal different from the first primary synchronization signals and a second secondary synchronization signal the same as the first secondary synchronization signal.

5. The method of claim 4 further comprising scrambling the first secondary synchronization signal and the second secondary synchronization signal with different scrambling codes.

6. The method of claim 1 wherein transmitting first synchronization signals in the first subframe comprises transmitting a first secondary synchronization signal in the first subframe and transmitting a first primary synchronization signal in one of the first subframe or a second subframe following the first subframe.

7. A base station in a heterogeneous communication network comprising first and second base stations with overlapping coverage areas, said base station comprising:
    a transceiver for communicating with one or more mobile terminals; and
    a control circuit for controlling the operation of the transceiver, said control circuit configured to:
        transmit first synchronization signals on first subcarrier frequencies for detection by a mobile terminal when the mobile terminal is operating outside a link imbalance zone, said first synchronization signals including a first primary synchronization signal and a first secondary synchronization signal; and
        transmit supplemental synchronization signals distinct from said first synchronization signals on said first subcarrier frequencies for detection by said mobile terminal when said mobile terminal is operating within a link imbalance zone, said supplemental synchronization signals including a second primary synchronization signal and a second secondary synchronization signal;
        wherein, the first and second secondary synchronization signals are transmitted in the same subframe on different OFDM symbols.

8. The base station of claim 7 wherein the supplemental synchronization signals transmitted by the control circuit comprise different symbol sequences than said first synchronization signals.

9. The base station of claim 7 wherein the control circuit is further configured to transmit a first secondary synchronization signal in the first subframe and to transmit a first primary synchronization signal in one of the first subframe or a second subframe following the first subframe.

10. The base station of claim 9 wherein the supplemental synchronization signals transmitted by the control circuit comprise a first primary synchronization signal and a second secondary synchronization signals.

11. The base station of claim 10 wherein the second primary synchronization signal and the second secondary synchronization signals transmitted by the control circuit as supplemental synchronization signals are different from the first primary synchronization signal and the first secondary synchronization signal.

12. The base station of claim 10 wherein the second primary synchronization signal transmitted by the control circuit is different from the first primary synchronization signal and the second secondary synchronization signal transmitted by the control circuit is the same as the first secondary synchronization signal.

13. The base station of claim 7 wherein the control circuit is configured to scramble the first and second secondary synchronization signals with different scrambling codes.

* * * * *

UNITED STATES PATENT AND TRADEMARK OFFICE
CERTIFICATE OF CORRECTION

Page 1 of 1

PATENT NO. : 8,937,937 B2
APPLICATION NO. : 12/897883
DATED : January 20, 2015
INVENTOR(S) : Lindoff et al.

It is certified that error appears in the above-identified patent and that said Letters Patent is hereby corrected as shown below:

In the Specification

In Column 1, Line 46, delete "pica" and insert -- pico --, therefor.

In Column 1, Line 57, delete "pica" and insert -- pico --, therefor.

In Column 2, Line 47, delete "and or" and insert -- and/or --, therefor.

In Column 3, Line 15, delete "pica" and insert -- pico --, therefor.

In Column 4, Line 4, delete "pica" and insert -- pico --, therefor.

In Column 5, Line 64, delete "detection," and insert -- detection --, therefor.

In the Claims

In Column 9, Line 56, in Claim 3, delete "signals" and insert -- signal --, therefor.

In Column 9, Line 61, in Claim 4, delete "signals and" and insert -- signal and --, therefor.

In Column 10, Line 46, in Claim 10, delete "signals." and insert -- signal. --, therefor.

In Column 10, Line 49, in Claim 11, delete "signals" and insert -- signal --, therefor.

Signed and Sealed this
Seventh Day of July, 2015

Michelle K. Lee
*Director of the United States Patent and Trademark Office*